(12) United States Patent
Qian et al.

(10) Patent No.: US 9,817,435 B2
(45) Date of Patent: Nov. 14, 2017

(54) CONDUCTIVE MESH AND TOUCH PANEL USING THE SAME

(71) Applicant: Beijing FUNATE Innovation Technology Co., LTD., Beijing (CN)

(72) Inventors: Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 118 days.

(21) Appl. No.: 14/693,898

(22) Filed: Apr. 23, 2015

(65) Prior Publication Data

US 2015/0309606 A1 Oct. 29, 2015

(30) Foreign Application Priority Data

Apr. 23, 2014 (CN) .......................... 2014 1 0164335

(51) Int. Cl.

| | |
|---|---|
| *G06F 3/041* | (2006.01) |
| *G06F 1/16* | (2006.01) |
| *G06F 3/044* | (2006.01) |
| *B82Y 40/00* | (2011.01) |
| *B82Y 15/00* | (2011.01) |

(52) U.S. Cl.
CPC .............. *G06F 1/16* (2013.01); *B82Y 40/00* (2013.01); *G06F 1/1643* (2013.01); *G06F 3/044* (2013.01); *B82Y 15/00* (2013.01); *G06F 2203/04103* (2013.01); *G06F 2203/04112* (2013.01); *Y10S 977/767* (2013.01); *Y10S 977/768* (2013.01); *Y10S 977/956* (2013.01)

(58) Field of Classification Search
CPC . G06F 3/02; G06F 3/041; G06F 3/045; G06F 3/042; G09G 5/00; B82Y 15/00
USPC ................ 977/742–763, 902, 932, 953, 956
See application file for complete search history.

(56) References Cited

U.S. PATENT DOCUMENTS

| | | | |
|---|---|---|---|
| 8,318,295 B2 | 11/2012 | Wang et al. | |
| 2008/0170982 A1* | 7/2008 | Zhang .................... | B82Y 10/00 423/447.3 |
| 2009/0167710 A1* | 7/2009 | Jiang ..................... | G06F 3/0412 345/173 |
| 2011/0020210 A1* | 1/2011 | Liu ......................... | B82B 3/00 423/447.1 |
| 2011/0032196 A1* | 2/2011 | Feng ....................... | G06F 3/045 345/173 |
| 2011/0051447 A1 | 3/2011 | Lee | |
| 2011/0095237 A1 | 4/2011 | Liu et al. | |
| 2011/0115727 A1* | 5/2011 | Feng ..................... | G06F 3/0412 345/173 |
| 2011/0155713 A1 | 6/2011 | Wang et al. | |

(Continued)

FOREIGN PATENT DOCUMENTS

| | | |
|---|---|---|
| CN | 2178579 | 10/1994 |
| CN | 101437663 | 5/2009 |

(Continued)

*Primary Examiner* — Pegeman Karimi
(74) *Attorney, Agent, or Firm* — Steven Reiss

(57) ABSTRACT

A conductive mesh for a touch panel consists of a plurality of carbon nanotube composite wires. The carbon nanotube composite wire comprises a carbon nanotube wire and a metal layer. The carbon nanotube wire comprises a plurality of carbon nanotubes spirally arranged along an axial direction of the carbon nanotube wire. A touch panel using the conductive mesh is also provided.

6 Claims, 6 Drawing Sheets

(56) References Cited

U.S. PATENT DOCUMENTS

2014/0028178 A1\* 1/2014 Liu .................. H01J 9/025
 313/346 R
2014/0320458 A1\* 10/2014 Wu .................. G06F 3/042
 345/175

FOREIGN PATENT DOCUMENTS

| CN | 101633500 | 1/2010 |
|----|-----------|---------|
| CN | 101976594 | 2/2011 |
| CN | 102040212 | 5/2011 |
| CN | 102111926 | 6/2011 |
| CN | 103276486 | 9/2013 |
| CN | 203178958 | 9/2013 |
| TW | 200939249 | 9/2009 |
| TW | 201241843 | 10/2012 |

\* cited by examiner

CONDUCTIVE MESH AND TOUCH PANEL USING THE SAME

CROSS-REFERENCE TO RELATED APPLICATIONS

This application claims all benefits accruing under 35 U.S.C. §119 from China Patent Application No. 201410164335.7, field on Apr. 23, 2014 in the China Intellectual Property Office, disclosure of which is incorporated herein by reference. The application is also related to copending applications entitled, "BINDING WIRE AND SEMICONDUCTOR PACKAGE STRUCTURE USING THE SAME", filed Apr. 23, 2015 Ser. No. 14/693,892; "CARBON NANOTUBE COMPOSITE WIRE", filed Apr. 23, 2015 Ser. No. 14/693,893; "HOT WIRE ANEMOMETER", filed Apr. 23, 2015 Ser. No. 14/693,894; "DEFROSTING GLASS, DEFROSTING LAMP AND VEHICLE USING THE SAME", filed Apr. 23, 2015 Ser. No. 14/693,895; "WIRE CUTTING ELECTRODE AND WIRE CUTTING DEVICE USING THE SAME", filed Apr. 23, 2015 Ser. No. 14/693,897; "ELECTROMAGNETIC SHIELDING MATERIAL AND CLOTHING USING THE SAME", filed Apr. 23, 2015 Ser. No. 14/693,899; "MASS FLOWMETER", filed Apr. 23, 2015 Ser. No. 14/693,901.

BACKGROUND

1. Technical Field

The disclosure generally relates to user interfaces.

2. Description of Related Art

Touch panel, as an input apparatus, has many advantages, such as being intuitive, simple, and fast. Therefore, the touch panel has been widely used in many electronic products, such as mobile phones, multimedia, public information inquiry system and the like. Touch panels can be resistive touch panel, capacitive touch panel, infrared touch panel, and surface acoustic wave touch panel.

Conductive mesh, as part of a touch panel, are mostly obtained by forming indium tin oxide (ITO) on an insulating substrate by vacuum coating and applying complex and precise patterned etching. Additionally, in the patterned etching, large amounts of ITO will be wasted, and industrial waste liquid containing heavy metals will be produced.

BRIEF DESCRIPTION OF THE DRAWING

Implementations of the present technology will now be described, by way of example only, with reference to the attached figures.

DETAILED DESCRIPTION

Figure 1:
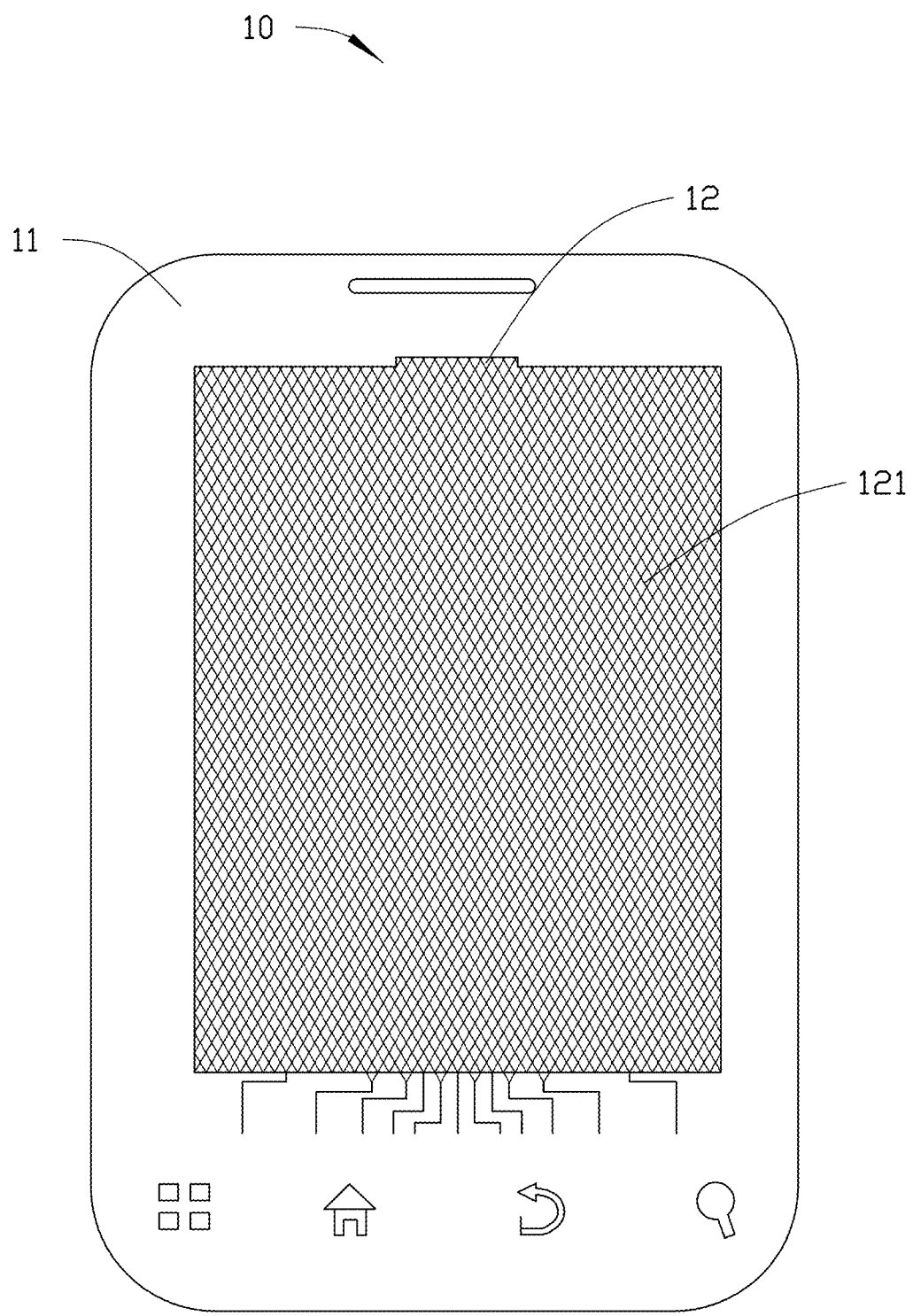
FIG. 1 is a schematic view of an embodiment of a touch panel.

It will be appreciated that for simplicity and clarity of illustration, where appropriate, reference numerals have been repeated among the different figures to indicate corresponding, or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
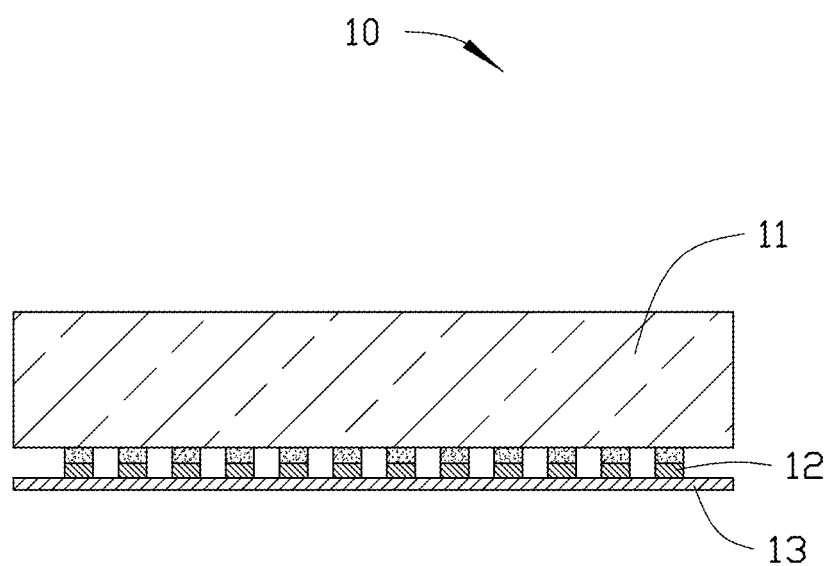
FIG. 2 is a sectional view of an embodiment of a touch panel.

FIG. 1 and FIG. 2 illustrate that a first embodiment of a touch panel 10 includes a transparent substrate 11, a transparent conductive mesh 12 located on the transparent substrate 11, and a protective layer 13 covering the transparent conductive mesh 12 and used to protect transparent conductive mesh 12. The transparent substrate 11 can be a polyethylene terephthalate (PET) substrate. The transparent conductive mesh 12 can be fixed on the transparent substrate 11 with an adhesive. In one embodiment, the adhesive is a UV adhesive. The transparent conductive mesh 12 is a patterned grid structure consisting of a plurality of carbon nanotube composite wires 121 braided together. The patterned grid structure includes a plurality of grid cells, and each grid cell can be diamond-shaped, rectangular, triangular, polygonal, or variously polygonal. In one embodiment, the grid cell is diamond-shaped.

Figure 3:
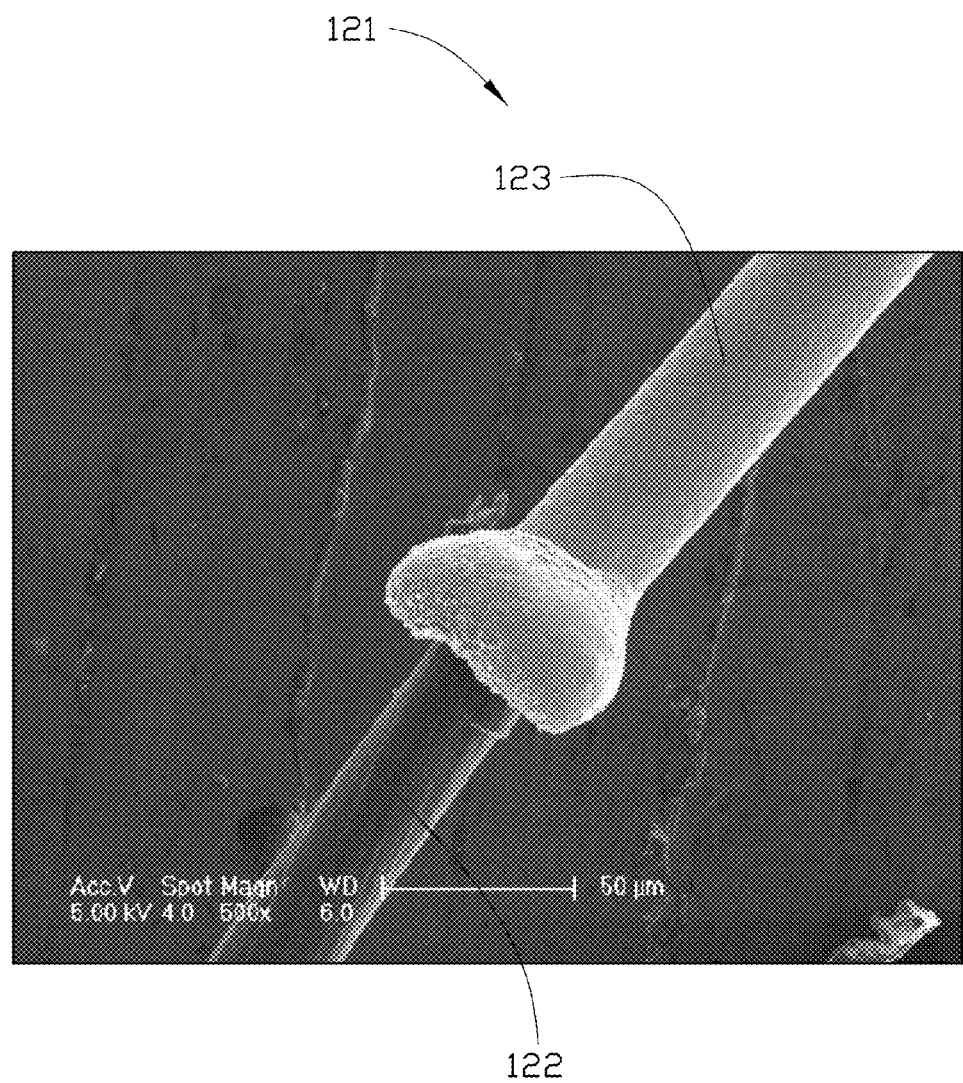
FIG. 3 shows a scanning electron microscope image of an embodiment of a carbon nanotube composite wire in a touch panel.

Referring to FIG. 3, the carbon nanotube composite wire 121 includes a carbon nanotube wire 122 and a metal layer 123 coated on an outer surface of the carbon nanotube wire 122. In one embodiment, the carbon nanotube wire 122 includes a plurality of carbon nanotubes spirally arranged along an axial direction of the carbon nanotube wire 122. The plurality of carbon nanotubes are secured together by van der Waals attractive force.

The carbon nanotube wire 122 includes a plurality of carbon nanotubes twisted with each other. The carbon nanotube wire 122 can be formed by twisting a carbon nanotube film. The carbon nanotube film can be drawn from a carbon nanotube array. The carbon nanotube film includes a plurality of carbon nanotubes parallel with each other. In one embodiment, the carbon nanotube film can be twisted clockwise to form an S-twist wire; in another embodiment, the carbon nanotube film can be twisted counterclockwise direction to form a Z-twist wire. The plurality of carbon nanotubes in the carbon nanotube film are substantially oriented along an axial direction of the carbon nanotube film, and joined end-to-end by van der Waals force in the axial direction of the carbon nanotube film. Therefore when the carbon nanotube film is twisted, the plurality of carbon nanotubes in the carbon nanotube wire 122 are spirally arranged along an axial direction of the carbon nanotube wire 122, in an end to end arrangement by van der Waals forces, and extends in a same direction.

During the twisting process of the carbon nanotube film, a space between adjacent carbon nanotubes becomes smaller along a radial direction of the carbon nanotube wire 122, and a contact area between the adjacent carbon nanotubes becomes larger along the radial direction of the carbon nanotube wire 122. Therefore, van der Waals attractive force between adjacent carbon nanotubes along the radial direction of the carbon nanotube wire 122 significantly increases, and adjacent carbon nanotubes in the carbon nanotube wire 122 are closely connected. In one embodiment, the space between adjacent carbon nanotubes along the radial direction of the carbon nanotube wire 122 is less than or equal to 10 nanometers. In one embodiment, the space between adjacent carbon nanotubes along the radial direction of the carbon nanotube wire 122 is less than or equal to 5 nanometers. In one embodiment, the space between adjacent carbon nanotubes along the radial direction of the carbon nanotube wire 122 is less than or equal to 1 nanometer. Since the space between adjacent carbon nanotubes in the radial direction of the carbon nanotube wire 122 is small, and adjacent carbon nanotubes are closely connected by van der Waals force; the carbon nanotube wire 122 includes a smooth and dense surface.

A diameter of the carbon nanotube wire 122 can range from about 1 micron to about 10 microns. A twist of the carbon nanotube wire 122 can range from about 10 r/cm to about 300 r/cm. In one embodiment, the twist of the carbon nanotube wire 122 ranges from about 250 r/cm to about 300 r/cm. The twist of the carbon nanotube wire 122 refers to the number of turns per unit length of the carbon nanotube wire 122. A predetermined twist to the optimal diameter gives the carbon nanotube wire 122 excellent mechanical properties.

Since the carbon nanotube wire 122 has a smooth and dense surface, the metal layer 123 and the carbon nanotube wire 122 can form a close bond, and the metal layer 123 is not easily detached from the carbon nanotube wire 122. The metal layer 123 is uniformly coated on the outer surface of the carbon nanotube wire 122. A thickness of the metal layer 123 ranges from about 1 micron to about 5 microns. When the thickness of the metal layer 123 ranges from about 1 micron to about 5 microns, a conductivity of the carbon nanotube composite wire 121 can reach 50 percent or more of a conductivity of the metal layer 123. If the thickness of the metal layer 123 is too small, such as less than 1 micron, the conductivity of the carbon nanotube composite wire 121 does not increase; on the contrary, the metal layer 123 will be easily oxidized, and the conductivity and service life of the carbon nanotube composite wire 121 will be reduced. In addition, experiments show that when the thickness of the metal layer 123 is greater than a certain value, such as more than 5 microns, the conductivity of the carbon nanotube composite wire 121 is not significantly increased in proportion to an increase of the diameter and weight of the carbon nanotube composite wire. A mechanical strength of the carbon nanotube wire 122 is about 5 to 10 times stronger than a mechanical strength of a gold wire of the same diameter. A material of the metal layer 123 can be selected from the group consisting of gold, silver, copper, molybdenum, tungsten, and other metals and their alloys having good electrical conductivity.

The metal layer 123 can be formed on the outer surface of the carbon nanotube wire 122 by a method such as plating, electroless plating, or vapor plating.

In one embodiment, the diameter of the carbon nanotube composite wire 121 is about 5 microns, wherein the diameter of the carbon nanotube wire 122 is about 3 microns, and the twist of the carbon nanotube wire 122 is about 280 r/cm. The metal layer 123 is a copper layer, and a thickness of the copper layer is about 1 micron.

According to a practical application, the diameter of the carbon nanotube composite wire 121 can be smaller, by controlling the diameter of the carbon nanotube wire 122 and the thickness the metal layer 123.

Figure 4:
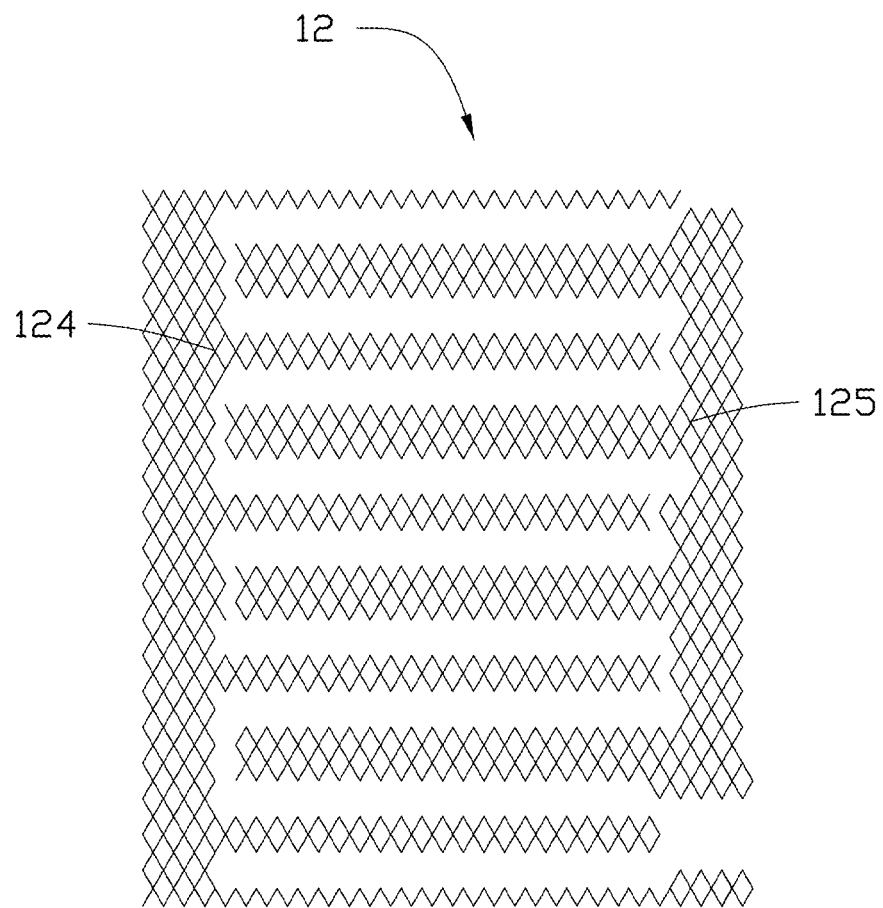
FIG. 4 is a schematic view of an embodiment of a conductive mesh in a touch panel.

Referring to FIG. 4, the transparent conductive mesh 12 includes at least one first conductive mesh 124 and at least one second conductive mesh 125. The first conductive mesh 124 and the second conductive mesh 125 are adjacent to and effectively insulated from each other. Each first conductive mesh 124 is a grid structure consisting of a plurality of carbon nanotube composite wires 121. The grid structure includes a plurality of grid cells electrically connected to each other. Each second conductive mesh 125 is located laterally to the corresponding first conductive mesh 124. The first conductive mesh 124 and the second conductive mesh 125 can form a mutual inductance.

Figure 5:
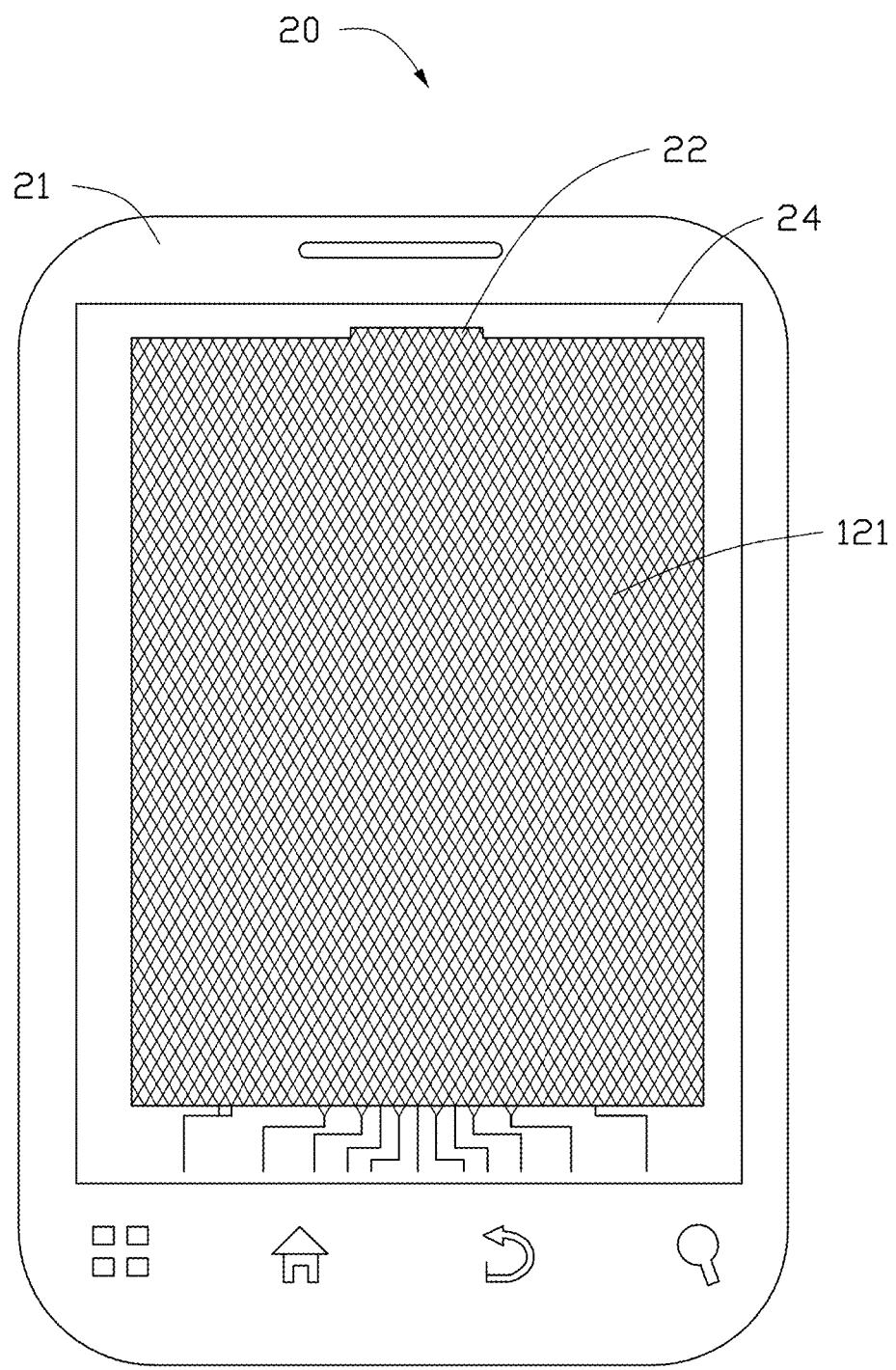
FIG. 5 is a schematic view of an embodiment of a touch panel.
Figure 6:
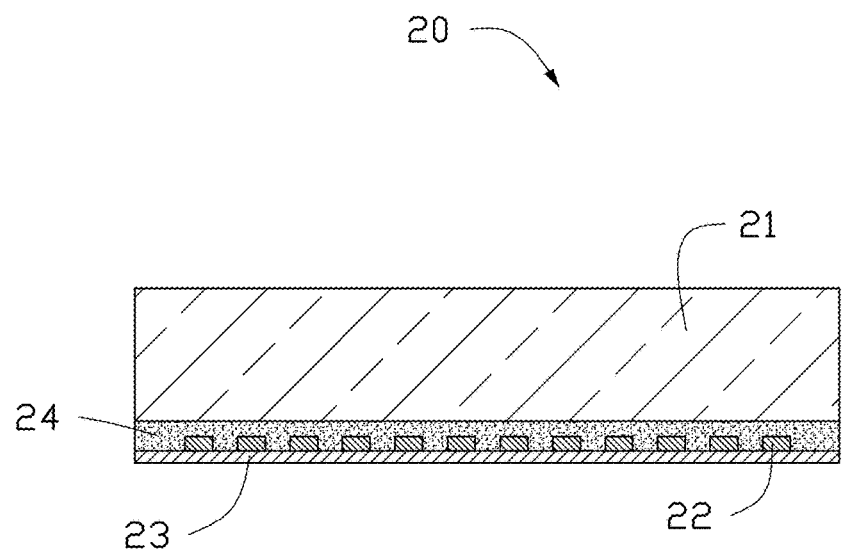
FIG. 6 is a sectional view of an embodiment of a touch panel.

FIG. 5 and FIG. 6 illustrate that a second embodiment of a touch panel 20 includes a transparent substrate 21, a stroma layer 24 located on a surface of the transparent substrate 21, and a transparent conductive mesh 22 embedded in the stroma layer 24. The transparent substrate 21 is a glass substrate. The transparent conductive mesh 22 is a patterned grid structure consisting of the plurality of carbon nanotube composite wires 121 braided together. The patterned grid structure includes a plurality of grid cells, and each grid cell can be diamond-shaped, rectangular, triangular, polygonal, or variously polygonal. In one embodiment, the grid cell is diamond-shaped. A structure of the carbon nanotube composite wires 121 in the second embodiment is the same as a structure of the carbon nanotube composite wires 121 in the first embodiment.

The stroma layer 24 is formed by curing a gel coated on a glass substrate. A thickness of the stroma layer 24 is smaller than a thickness of the glass substrate. In one embodiment, the gel is a solvent-free UV-curable acrylic resin. The gel can be other photocurable adhesives, thermosetting adhesives, or air-drying adhesives. A groove (not shown), whose graph is the same as that of the patterned grid structure, are formed on the stroma layer 24. The transparent conductive mesh 22 is accommodated in the groove. A depth to width ratio of the groove is less than 1, and a depth of the groove is not less than a thickness of the transparent conductive mesh 22. The transparent conductive mesh 22 can be embedded in the stroma layer 24 and is protected by the stroma layer 24.

In one embodiment, the touch panel 20 further includes a protective layer 23. The protective layer 23 covers the stroma layer 24 and the transparent conductive mesh 22. The protective layer 23 is used to protect the stroma layer 24 and the transparent conductive mesh 22.

The transparent conductive mesh is a patterned grid structure comprising the plurality of carbon nanotube composite wires. The carbon nanotube composite wire includes a carbon nanotube wire and a metal layer coated on an outer surface of the carbon nanotube wire. The advantages of the transparent conductive mesh of this present disclosure are that the process is simpler, the yield rate is higher, and the cost is lower. Compared with the transparent conductive mesh consisting of an ITO film, an etching process is not needed in this present disclosure, so materials of conductive films will not be wasted, and environmental pollution avoided. The carbon nanotube composite wire has excellent mechanical properties and conductivity, thus the touch panel of this present disclosure has a long service life and high touch accuracy.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with other embodiments. The above-described embodiments illustrate the scope of the present disclosure but do not restrict the scope of the present disclosure.

What is claimed is:

1. A conductive mesh comprising:
a plurality of carbon nanotube composite wires, each of the plurality of carbon nanotube composite wires comprising:
a carbon nanotube wire; and
a metal layer coated on an outer surface of the carbon nanotube wire,
wherein the carbon nanotube wire comprises a plurality of carbon nanotubes spirally arranged along an axial direction of the carbon nanotube wire, a diameter of the carbon nanotube wire ranges from 1 micron to 10 microns, a twist of the carbon nanotube wire ranges from 10 r/cm to 300 r/cm, and a metal layer thickness ranges from 1 micron to 5 microns, when the metal layer thickness ranges from 1 micron to 5 microns, a conductivity of the carbon nanotube composite wire reaches 50 percent or more of a conductivity of the metal layer; when the metal layer thickness is less than 1 micron, the conductivity of the carbon nanotube composite wire does not increase; when the metal layer thickness is larger than 5 microns, the metal layer is oxidized, the conductivity of the carbon nanotube composite wire and a service life of the carbon nanotube composite wire are reduced.

2. The conductive mesh of claim 1, wherein a mechanical strength of the carbon nanotube wire is 5 to 10 times stronger than a mechanical strength of a gold wire of equal diameter.

3. The conductive mesh of claim 1, wherein the thickness of the metal layer is about 1 micro, the diameter of the carbon nanotube wire is about 3 micros, and the twist of the carbon nanotube wire is about 280 r/cm.

4. A touch panel comprising:
a substrate; and
a conductive mesh located on the substrate and comprising a plurality of carbon nanotube composite wires,
wherein each of the plurality of carbon nanotube composite wires comprises a carbon nanotube wire, and a metal layer located on an outer surface of the carbon nanotube wire; the carbon nanotube wire comprises a plurality of carbon nanotubes spirally arranged along an axial direction of the carbon nanotube wire, a carbon nanotube wire diameter ranges from about 1 micron to about 10 microns, a carbon nanotube wire twist ranges from 10 r/cm to 300 r/cm, and a metal layer thickness ranges from 1 micron to 5 microns, when the metal layer thickness ranges from 1 micron to 5 microns, a conductivity of the carbon nanotube composite wire reaches 50 percent or more of a conductivity of the metal layer; when the metal layer thickness is less than 1 micron, the conductivity of the carbon nanotube composite wire does not increase; when the metal layer thickness is larger than 5 microns, the metal layer is oxidized, the conductivity of the carbon nanotube composite wire and a service life of the carbon nanotube composite wire are reduced.

5. The touch panel of claim 4, further comprising a stroma layer.

6. The touch panel of claim 5, wherein the stroma layer comprises a groove, and the conductive mesh is accommodated in the groove.

* * * * *